Jan. 7, 1930.                    L. B. FISH                    1,742,243
                        CABLE CLAMP AND BRIDLE RING
                            Filed Dec. 2, 1924
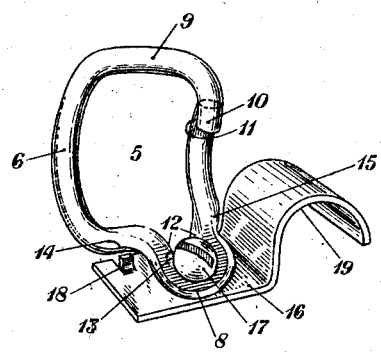
INVENTOR
*L.B.Fish*
BY
ATTORNEY Patented Jan. 7, 1930

1,742,243

UNITED STATES PATENT OFFICE

LEWIN B. FISH, OF MAPLEWOOD, NEW JERSEY, ASSIGNOR TO AMERICAN TELEPHONE AND TELEGRAPH COMPANY, A CORPORATION OF NEW YORK

CABLE CLAMP AND BRIDLE RING

Application filed December 2, 1924. Serial No. 753,518.

This invention relates to devices for hanging or supporting electric cables and wires along the faces of walls, ceilings, fences, or the like.

An object of the invention is to provide a simple, inexpensive and efficient arrangement of the above character which possesses advantages over those which have been previously used.

Other and further objects of the invention will be apparent from the following description, when considered in connection with the accompanying drawing, in which one embodiment thereof is illustrated.

In the drawing, Figure 1 is a perspective view of an improved bridle ring and cable clamp.

In practice it is often necessary after the mounting of a cable upon a supporting surface, to which it is secured by means of a cable clamp, to string additional loose bridle wires parallel to the cable. These wires are usually supported upon bridle rings, and, by the present invention, the rings may be used separately for this purpose, or in combination with the cable clamps to which they may be attached.

Referring to the drawing, the numeral 5 represents a ring which is composed of a single piece of steel wire, and in the present instance for the purpose of illustration it is bent in substantially rectangular shape, although other shapes may be used. A pair of arms 6 and 7 extend in parallel relation from the base 8. The arm 6 has a bent portion 9 which extends at right angles therefrom and terminates in a hooked end 10 which overlaps the end 11 of the arm 7, in such manner as to provide a space between the two ends through which wires may be inserted within the confines of the ring. The space or opening is provided between the ends of the arms 6 and 7 so that additional wires may be readily inserted through said opening. The base 8 of the ring 5 is provided with a semi-circular turn or throat 12 formed in a plane at right angles to the plane of the ring. The wire in this throat 12 has a somewhat flattened upper portion in order to provide a better seating for the enlarged head of a screw, nail, bolt or toggle by which it is secured to a wall, and a counterbored portion 13 is provided around the center of the throat 12 so that if the screw, or other attaching means, becomes loosened the ring will not be so likely to become detached. The base 8 and arm 6 of the ring are so shaped that when the ring is mounted on a vertical surface, the wires are brought close to the mounting surface and away from the opening in the ring so that the wires are more protected than in the former types of rings. The base 8 is provided with shoulders 14 and 15 which extend outwardly from the throat 12 and connect with the arms 6 and 7, respectively.

The bridle ring is adapted to be used independently or in combination with a cable clamp. In its independent use it may be attached to a wall or ceiling in a vertical or horizontal position. The ring is shankless thereby permitting its use on all surfaces by using standard attaching devices. The comparatively wide throat 12 permits the ring 5 to be installed after the attaching device is placed and driven almost home. The counterbore 13 locks the head of the attaching device so that the ring will not fall off, even if the attaching device is loosened slightly. This permits rapid installation, especially when installing on screws already driven and holding cable clamps. In this case, the screw is backed out a few turns, the ring inserted, and the screw turned home again.

When the ring 5 is used in combination with a cable clamp, a common form of which is indicated at 16, the bridle ring 5 may be attached to said clamp by loosening screw 17 which secures the clamp to its supporting surface and slipping the bridle ring under the enlarged head of the screw, after which the screw may be tightened so that both the clamp and bridle ring are securely fastened to the supporting surface, as will appear below. The clamp 16 is shown as having a lip 18 formed from a bent up portion on the flat surface or heel at the edge of clamp upon which the shoulder 14 of the ring is positioned. The opposite shoulder 15 rests against the outer edge of the hook portion 19 of the cable clamp, so that when the ring is mounted thereon, its rotation is prevented by contact of the shoulder 14 and lip 18 on one side and the shoulder 15 and hook portion 19 on the opposite side. The screw 17 or other attaching device passing through the alined openings of the ring and cable clamp secures them together against the surface upon which they are to be mounted. When thus mounted with the enlarged head of the screw seated in the counterbored portion of the throat, the ring is locked and prevented from rotating.

While the arrangements of this invention have been illustrated as embodied in certain specific forms which have been deemed desirable, it will be understood that they are capable of embodiment in many and widely varied forms without departing from the spirit of the invention, as defined in the appended claim.

What is claimed is:

A bridle ring adapted to be associated with a cable clamp having a hook portion and a flat portion, said flat portion having a lug adjacent one edge thereof, said bridle ring comprising a base member in the form of a loop adapted to be seated on the flat portion of said clamp, the arms of said base loop extending in a direction at substantially right angles to the sides of the loop and in the same plane as the loop to form shoulders, said arms also being bent in a plane at right angles to the loop of one of the arms terminating in a hook portion having an end extending parallel to the opposite arm and overlapping the end thereof, the ends of said arms having an intervening space between their overlapping portions to permit the insertion of wires within the confines of the ring so formed, the loop forming the base of the ring having a counterbored surface, said counterbored portion being adapted to seat the enlarged head of an attaching device to lock the clamp and the bridle ring together to a supporting wall with the shoulder of one arm of the loop engaging said lug and with the shoulder of the other arm engaging said hook portion to prevent rotation of the ring on the clamp.

In testimony whereof, I have signed my name to this specification this 1st day of December, 1924.

LEWIN B. FISH.